United States Patent [19]

Sprecher et al.

[11] Patent Number: 5,298,707
[45] Date of Patent: Mar. 29, 1994

[54] APPARATUS FOR PREPARING FAT FREE SNACK CHIPS

[75] Inventors: Peter Sprecher, Santa Barbara, Calif.; John Weidersatz, Louisville, Ky.; David Gaon, San Jose, Calif.

[73] Assignee: TGTBT, Ltd., Santa Barbara, Calif.

[21] Appl. No.: 1,312

[22] Filed: Jan. 6, 1993

Related U.S. Application Data

[63] Continuation-in-part of Ser. No. 828,406, Jan. 31, 1992, Pat. No. 5,202,139, which is a continuation-in-part of Ser. No. 712,196, Jun. 7, 1991, Pat. No. 5,180,601.

[51] Int. Cl.$^5$ ............................ A23L 1/00; H05B 6/00
[52] U.S. Cl. ........................................ 219/693; 34/1 P; 34/17; 99/451; 99/DIG. 14; 219/700; 426/243
[58] Field of Search ................. 219/10.55 A, 10.55 E, 219/10.55 R; 34/1 P, 1 V, 17, 18, 68; 99/451, DIG. 14; 426/243

[56] References Cited

U.S. PATENT DOCUMENTS

| | | | |
|---|---|---|---|
| 3,365,301 | 1/1968 | Lipoma et al. | 99/100 |
| 3,469,996 | 9/1969 | Endres et al. | 219/10.55 A |
| 3,474,544 | 10/1969 | Holden, Jr. et al. | 34/1 V |
| 3,502,479 | 3/1970 | Singer et al. | 99/100 |
| 3,710,064 | 1/1973 | Mathur | 219/10.55 A |
| 3,765,425 | 10/1973 | Stungis et al. | 219/10.55 A |
| 3,989,849 | 11/1976 | Fogel et al. | 426/242 |
| 4,149,322 | 4/1979 | Minoda et al. | 34/4 |
| 4,283,425 | 8/1981 | Yuan et al. | 426/102 |
| 4,800,090 | 1/1989 | August | 426/243 |
| 4,906,483 | 3/1990 | Kloos | 426/243 |
| 4,933,194 | 6/1990 | Barry et al. | 426/144 |
| 4,933,199 | 6/1990 | Neel et al. | 426/438 |

FOREIGN PATENT DOCUMENTS 1151945  8/1983  Canada ........................... 99/174

*Primary Examiner*—George Yeung
*Attorney, Agent, or Firm*—Poms, Smith, Lande & Rose

[57] ABSTRACT

A method and apparatus for preparing essentially fat free chips such as potato chips and the like having an appearance and taste similar to conventional chips without the use of deep fat frying processes. The method of the present invention includes the steps of exposing sliced raw potatoes and the like to a high intensity microwave field that rapidly converts moisture within the slice into steam. These exposed slices are then dried by longer exposure to a lower energy microwave field. The apparatus of the present invention includes a meander waveguide with a microwave absorptive terminator at an end of the waveguide. Apertures are provided along portions of the waveguide for transporting the potato slices and the like through the waveguide. A belt link type conveyor belt having an open lattice structure is employed to convey raw product slices through the meander waveguide. Generally each conveyor belt link has a product slice supporting surface configured to define a hump so as to impart a potato chip-like shape to the raw product slices during the high intensity microwave exposure step. The crisp chip type food product produced by this method and apparatus has not had any fat added to the chip and is therefore low in calories though having the conventional texture and taste associated with deep fat fried chip foods.

21 Claims, 5 Drawing Sheets

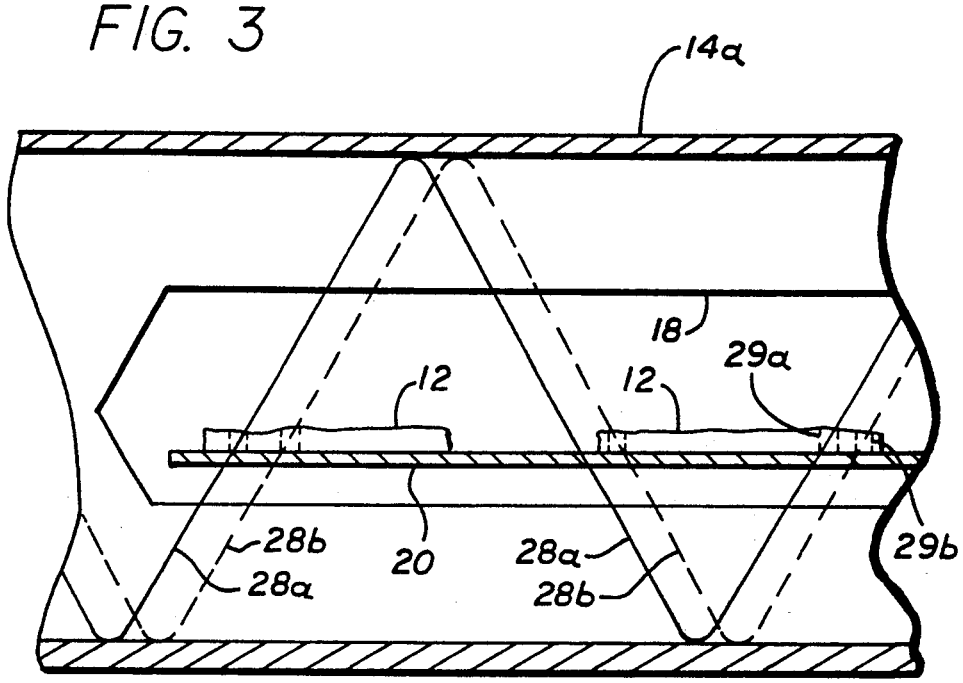
FIG. 3
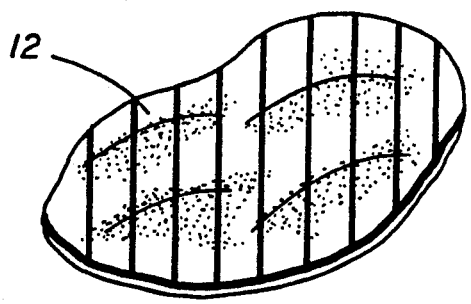
FIG. 4
FIG. 5
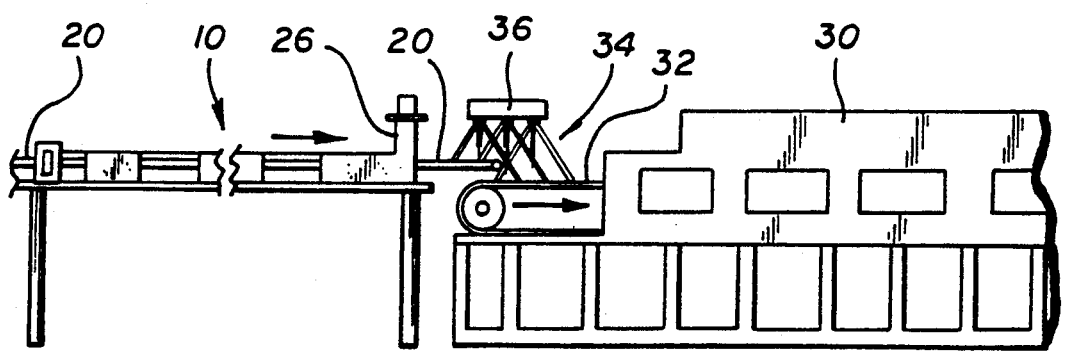

APPARATUS FOR PREPARING FAT FREE SNACK CHIPS

CROSS REFERENCE TO EARLIER APPLICATIONS

This application is a continuation-in-part of U.S. application Ser. No. 07/828,406, filed Jan. 31, 1992, now U.S. Pat. No. 5,202,139, which is in turn a continuation-in-part of parent U.S. application Ser. No. 07/712,196, filed Jun. 7, 1991, now U.S. Pat. No. 5,180,601.

FIELD OF THE INVENTION

The present invention relates generally to a process and apparatus for preparing various kinds of chips without immersion in heated oil and, more particularly, to an apparatus used in a fat free method for preparing potato chips.

BACKGROUND OF THE INVENTION

A variety of methods are known in the food preparation art for preparing snack foods such as potato chips and other forms of vegetable and grain chips such as corn or tortilla chips. Most of these methods, however, rely on cooking techniques in which the potato or other chip is immersed in a reservoir of hot oil for a period of time. Known as "deep fat" frying, the effect of this cooking process is to substantially reduce the water content of the potato slice while allowing some fat uptake from the hot oil reservoir. The moisture content of fresh potato slices is typically about 85% of the weight of the slice while "deep fat" fried potato chips commonly have a moisture content of less than 5% by weight. The deep fat frying process, however, also typically results in a finished potato chip having a fat content from about 30% to about 45% of the total weight of the finished chip.

The high fat content of conventionally prepared potato chips is considered undesirable by many people because of the increased caloric value and the relatively short shelf life of the resulting chip. The fat stored in a potato chip can become rancid after long term storage, imparting an undesirable odor and taste to the chip. A number of cooking methods have been developed in the past to reduce the fat content of potato chips and the like. U.S. Pat. No. 3,365,301 to Lipoma et al., for example, discloses a process for making fried chips by partially cooking potato slices in an oil bath at higher temperatures and for shorter periods of time than normally used in conventional oil immersion cooking processes, with a final cooking step employing electromagnetic heating, such as microwave heating. The higher temperature and shorter time period of the oil immersion portion of the Lipoma cooking process is believed to result in a final chip having a reduced fat content. This approach, however, does not eliminate the uptake of fat by the chip during the first step of the cooking process. Another approach, disclosed in U.S. Pat. No. 4,283,425 to Yuan et al., is to prepare potato chips by coating a raw potato slice with globular proteins and an optional layer of edible oil on top of the protein coating. The potato slice prepared in this fashion is then cooked by microwave heating. While eliminating the step of deep fat frying, the Yuan approach still produces a potato chip having an exterior coating of at least globular proteins. At column 3, lines 47-59, the Yuan patent states the protein coating is an essential element in successfully microwaving the potato slices. Use of microwave heating alone to prepare potato chips has previously been considered unsuitable because of gelatinization, a tendency of starches in the potato slice to coat the exterior surfaces of the slice and to form a gummy seal which hardens with further heating. The Yuan patent, for example, notes at column 2, lines 45-50 that efforts to remove more than 3% of the moisture content of a potato slice by microwave heating causes starch gelatinization.

The present invention further relates to the use of a unique meander waveguide structure in conjunction with a novel conveyor belt. Various sorts of microwave waveguides are known as shown in, for example, U.S. Pat. No. 3,469,996 to Endres and U.S. Pat. No. 3,765,425 to Stungis et al. The Endres patent shows a zig-zag waveguide configured to direct microwave energy downward through slots in a lower planar surface of the waveguide onto a conveyor belt passing below the waveguide in order to temper shortening carried on the conveyor belt. The Stungis patent discloses a serpentine waveguide repetitively engaging a conveyor belt, in order to expand tobacco stems and lamina.

The use of conveyor belts to convey raw and partially prepared food products is also known. In the field of conveyor belts, U.S. Pat. Nos. 3,870,141 and 4,556,142 to Lapeyre, for example, show conveyor belts having links in the form of flat lattice type structures. U.S. Pat. No. 4,993,543, to Lapeyre, discloses a type of conveyor belt link having a protruding drive tooth. The drive teeth of the links engage a drive sprocket that powers the conveyor belt. These conveyor belt structures, however, possess only a flat conveying surface. Limp, raw food products conveyed by these belt structures would normally result in finished food products having a similarly flat shape.

Thus there still exists a need for an apparatus and method of preparing potato and like vegetable chips, as well as corn, tortilla and other grain chips, having all of the taste, consistency and shape of the widely known and broadly appreciated deep fat fried potato, corn and tortilla chips, but which are fat free or virtually fat free and which are curved.

SUMMARY OF THE INVENTION

In broad terms the present invention concerns a method and apparatus for preparing potato, corn and other chips that is fast, economical and entirely free of any fat frying or oil coatings. The method of the present invention includes a first cooking step of exposing raw potato slices or other vegetable or grain slices to a very high intensity microwave field in order to rapidly convert a substantial portion of the moisture in the raw slice into steam. This intense microwave heating has the effect of puffing the slices and producing increased porosity and surface roughness. During this step the moisture content of potato slices can be reduced from an initial moisture content of about 80% of the weight of the potato slice to a final moisture content of about 25% to 30%. The potato slices are then subjected to a drying step, which can be a combination of low intensity microwaves and convective hot air heating to dry and crispen the puffed and roughened slices into completed chips.

In the preferred embodiment, slices of potatoes or other flat portions of appropriate vegetables, grains and the like are arranged in a single layer on a conveyor belt during the first high intensity microwave exposure step. In the case of potato slices that are being made into potato chips, surface moisture is first preferably, though not necessarily, removed from the raw potato slices. During the subsequent drying and crispening step, the potato or other product slices need not be arranged in a single layer but may, instead, be arranged in layers up to 4 inches thick. The potato or other product slices may also be seasoned by conventional processes between the first cooking and second drying steps, if desired.

In a preliminary step, exposure of raw product slices to microwave radiation is accomplished in the present invention by passing a conveyor belt, carrying the product slices, through a meander waveguide. Furthermore, the present invention utilizes microwave energy to cook the food product slices in a manner that avoids starch gelatinization; by comparison, starch gelatinization does not exist in tobacco products.

As mentioned above, the apparatus of the present invention also includes a conveyor belt structure for supporting the potato slices in a single layer and a series of single mode travelling wave microwave waveguides each having a series of apertures through which the conveyor belt passes. A microwave terminator is also located at one end of each waveguide to maintain a substantially single mode of propagation within the waveguide. The conveyor belt is of a microwave-transparent material such as polypropylene or fiberglass covered with an adhesion resistant substance such as TEFLON TM.

In a preferred embodiment, the conveyor belt is comprised of a plurality of links, that are interconnected by pivotally mounted pins so as to form a continuous belt. Each link has an open lattice structure, wherein vanes are disposed in parallel planes that are intersected at about right angles by two parallel cross-pieces. Each vane includes two surfaces, one surface that engages a drive roller that powers the belt and another oppositely disposed surface that features a hump. The hump imparts a curved shape to the cooked potato or other food product slices that are randomly scattered on the conveyor belt. The conveyor belt of the present invention is also distinguishable from the conventional conveyor belt structures discussed above because the belt links of the present invention include humps that specifically impart a curved shape to the product slices, and are not used to engage a drive sprocket or roller.

The present invention also includes a second apparatus combining both hot air convective heating and lower energy multi-mode microwave heating disposed at an output end of the conveyor belt for the second drying step.

The novel feature of the present invention will be better understood from the following detailed description, considered in connection with the accompanying drawings. It should be understood, however, that the drawings are for purposes of illustration and description only and are not intended as a definition of the limits of the present invention.

BRIEF DESCRIPTION OF THE DRAWINGS

FIG. 3 is a side view of a single section of the microwave waveguide of the present invention;

FIG. 4 is a perspective view of a potato slice after exposure to a single portion of the microwave waveguide during the cooking step;

FIG. 5 is a perspective diagram of one embodiment of the apparatus of the present invention;

DETAILED DESCRIPTION

The methodology of the present invention is suitable for the preparation of fat free chips made from a wide variety of vegetables, grains, fruit and the like which can be cut or otherwise formed into flat, generally thin slice-shaped portions. The methodology of the present invention is also suitable for the preparation of a variety of products that are traditionally baked such as crackers, some forms of biscuits and the like. The present invention is especially adapted for the preparation of fat free potato chips. The various types of potatoes traditionally preferred for potato chips made by conventional deep fat frying chip processes may be employed in the practice of the present invention. Some varieties of potatoes that have normally been undesirable for deep fat frying may also be employed in the practice of the present invention. The present invention may be used to prepare chips from raw vegetables, potatoes and the like that have been cut into slices or, alternatively, vegetable, potato, corn or other grains may be ground into a dough or paste and then shaped into generally flat slice-shaped configurations for preparation into a chip. In this description, the term raw product slices shall mean any of the cut or formed slices comprising any of the items or materials described above. For clarity of explanation the present invention will be described in the context of preparing fat free potato chips. It should be understood, however, that the following description of the present invention is in no way intended to limit the invention to the preparation of potato chips alone.

Figure 1:
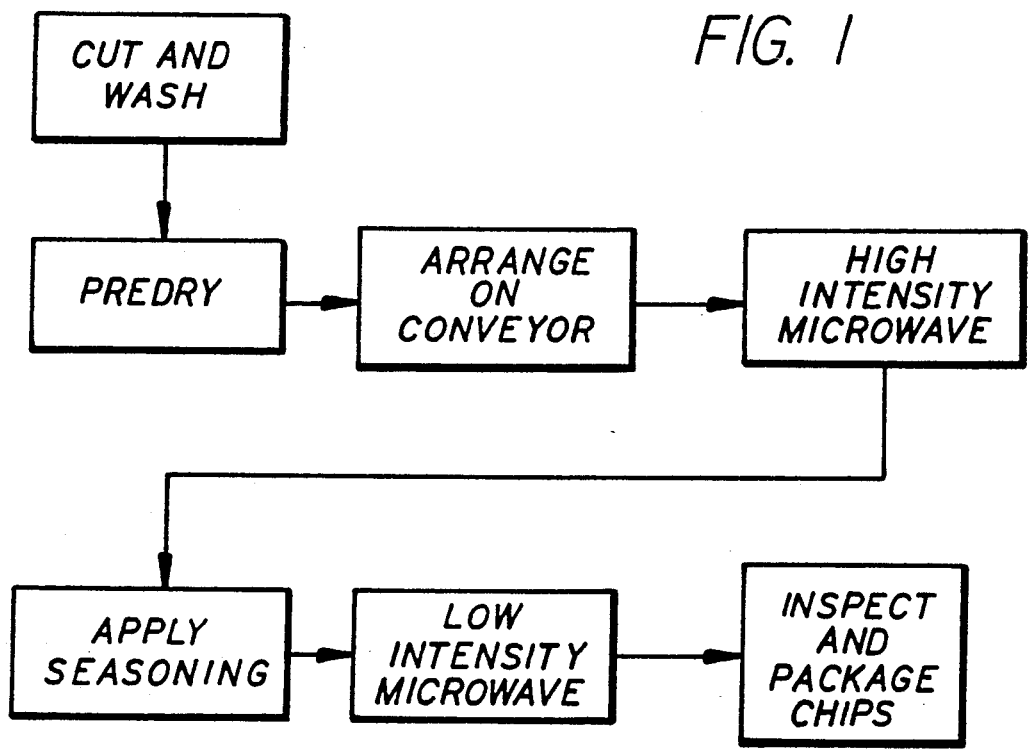
FIG. 1 is a flow chart of the method of the present invention.

Referring to the figures and, more particularly to FIG. 1, there is shown a flow chart of the method of the present invention. As shown, initial preparation of raw potato slices includes the steps of washing the raw potatoes and cutting them into slices. If desired, the potato may be peeled prior to slicing. The microwave exposure cooking step can be performed with potato slices of varying thicknesses. Thus the potato slices may have thickness varying in a range, depending upon the desired thickness of the final chip. Typically, the potato slices are approximately 1/16 of an inch thick. Potato chips have been satisfactorily prepared by the method of the present invention, however, using raw potato slices ranging from between about 0.040 and 0.070 inches in thickness. No surface coatings or layers are either required or desired on the exterior surfaces of the potato slices prior to the initial cooking step. Although surface moisture need not be removed from the exterior surfaces of the potato slices it has been determined that removal of surface moisture facilitates the subsequent high intensity microwave exposure cooking step of the present invention. If the surface moisture is not removed, electrical arcing may also occur between adjacent potato slices in contact with one another. This arcing may also occur across the surface of a raw potato slice. It is believed this arcing reduces the transfer of microwave energy to the potato slice and, in some instances, may leave undesirable scorch marks on the potato slices.

Preferably most of the surface moisture of the potato slices is removed prior to subjecting the potato slices to the intense microwave exposure of the cooking step. In one preferred embodiment of the chip preparation method of the present invention, removal of the surface moisture from the raw potato slices results in a reduction in the moisture content of the slices by about 5% to 6% by weight of the potato slice with a desired optimum of about 5.5% of the moisture content by weight being removed. Removal of a lesser amount of surface moisture may result in some arcing occurring. Removal of a greater degree of moisture can cause the formation of a starch layer on the surface of the potato chip. This starch layer typically adversely affects the taste of the resultant chip. It has also been discovered that the formation of a starch layer may adversely affect the taste of the resultant chip over time.

In one preferred embodiment, the removal of surface moisture is achieved by use of conventional "air knives" type air jets. Air knives are a type of forced air currents generally used to remove surface coatings. In this embodiment the air knives use heated jets of air that are directed from above and below the raw, freshly washed and sliced, potato slices. These air currents are typically within a range of temperature between about 150 and 250 degrees Fahrenheit, with a preferred temperature of about 220 to 240 degrees Fahrenheit. Typical flow rates for these hot air currents are preferably between about 2500 and 3000 feet per minute.

As shown in the flow chart of FIG. 1, the potato slices are first exposed to a very high intensity microwave field for a brief period of time to rapidly convert moisture within the potato slice into steam which escapes from the slice. These substantially dehydrated slices are then dried and crispened. In the preferred embodiment this drying step is accomplished by exposure to a combination of hot air and lower intensity microwave heating to produce a fat free chip having a moisture content of only a few percent by weight. The chips are then in final form, ready for any desired final inspection and packaging. As shown in FIG. 1, in the preferred embodiment flavoring may be applied to exterior surfaces of the potato slices after the initial cooking step and before the final drying step. This flavoring may include minute quantities of various forms of natural oil flavorings and the like. Preferably less than ½ gram of flavoring per ounce of weight of the potato slice is applied if natural oils are employed as the flavoring. Additionally, salt may also be applied to the exterior surfaces of the potato slices after the initial cooking step and before the final drying step in order to flavor the final chips. Neither the natural flavorings nor the salt, however, are currently believed to have any affect on the final drying process of the partially cooked potato chips. Seasonings, such as barbecue flavoring, may also be applied by spraying the puffed and roughened potato slices after the initial cooking step and before the final drying step or, alternatively, after the final drying step. It is currently believed the taste of the final chip may be enhanced by applying a seasoning spray after the final drying step.

The very high intensity of the initial microwave field is purposely selected to rapidly convert a major portion of the moisture within the potato slice into a heated vapor. While typically raw potato slices have a moisture content of approximately 80% by weight, the initial exposure of the potato slices to the high intensity microwave field reduces the moisture content of the slices to about 25% to 30% by weight. Water vapor and steam occupy a substantially greater volume than the same quantity of water in liquid form. The rapid conversion into steam of the water within the potato slice thus has a desirable effect of also causing the potato slice to puff up. This steam quickly escapes from the potato slice, having the effect of increasing the roughness and surface porosity of the slice. The increased surface porosity facilitates further dehydration of the potato slice and also provides a desirably roughened outer texture characteristic of traditionally deep fried potato chips.

It is believed the rapid conversion of a substantial portion of the moisture in the potato slice into steam and the violent departure of the steam from the potato slice prevent gelatinization, the formation and hardening of a starch layer on the exterior surfaces of the slice. The intensity of the microwave field to which the potato slices are exposed can be varied, along with the duration of the microwave exposure, to achieve the desired effect of preventing gelatinization by rapidly converting water within the potato slice into steam that swiftly escapes from the potato slice. The duration of microwave exposure should be increased as the intensity of the microwave field is decreased. Additionally, a higher intensity field may be desired if the thickness of the slice is increased. It is presently believed that gelatinization can be avoided for microwave exposure periods lasting up to several minutes if a sufficiently high intensity microwave field is used. More specific ranges of microwave fields are presented in example below. After exposure to the high intensity microwave field, the puffed and roughened potato slices can then be dried into a chip without further concern for gelatinization. During the final drying step the moisture content of the potato slice is further reduced from about 25% to 30% by weight to a final moisture content of between about 3% to 6% by weight.

Figure 2:
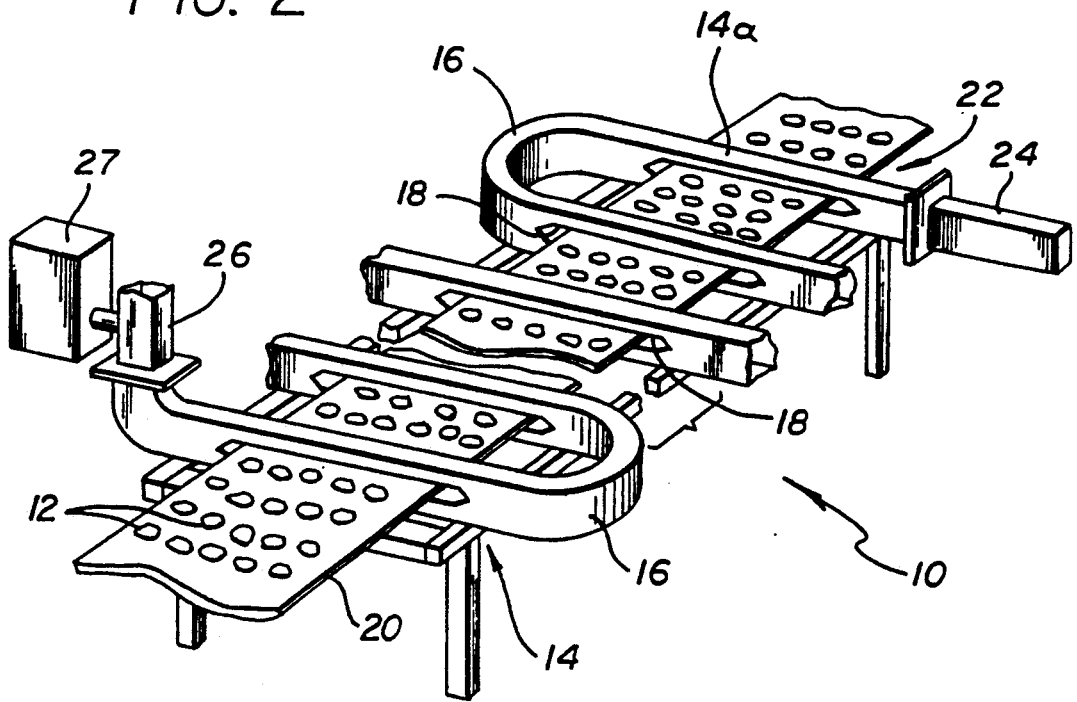
FIG. 2 is a perspective view of one preferred embodiment of the apparatus of the present invention for subjecting potato, vegetable or grain slices to a high intensity single mode microwave field during the cooking step.

The initial cooking step of exposing the potato slices to a high intensity microwave field in order to puff and roughen the slices by rapidly reducing the moisture content of the slices can be achieved by a variety of ways. In one preferred embodiment, a travelling wave microwave waveguide is employed along with a microwave-transparent conveyor belt to transport the potato slices through slots in the waveguide. Referring to FIG. 2, one preferred embodiment is shown having apparatus 10 suitable for exposing potato slices 12 to a suitably high intensity microwave field. The apparatus 10 includes a meander waveguide 14 through which a generally single mode microwave field propagates. The waveguide 14 doubles back on itself repeatedly through a series of 180 degree bends 16 and is provided with a series of long, narrow apertures 18 through which a conveyor belt 20 is disposed so as to transport the potato slices 12 through the multiple lengths of the waveguide 14. Importantly, it has been determined that the aperture 18 defines an opening that is optimally one and three eighths inches in height. If the aperture 18 is too large, microwave energy leaks out of the waveguide and is thus wasted. If the aperture 18 is too small, however, the potato slices 12 and conveyor belt 20 may disadvantageously scrape or bump against the perimeter of the aperture 18, possibly causing displacement or removal of the potato slice from the conveyor belt 20.

In this preferred embodiment, the waveguide 14 repetitively engages the conveyor belt 20 a total of twenty times or more. Only five straight-line lengths awe of the waveguide 14 are shown in FIG. 1, however, for purposes of clarity. To facilitate formation of a single mode field within the waveguide 14, the end 22 of the waveguide 14 includes a water load 24 to absorb substantially all of the microwave energy propagating through to the waveguide end 22. The number of straight-line portions 14a, of the waveguide 14 through which the potato slices 12 are carried may preferably be selected to optimize energy transfer from the microwave field within the waveguide 14 to the potato slices 12. Using the preferred embodiment having twenty or more straight-line waveguide portions 14a, approximately 80% of the initial microwave energy injected into the waveguide 14 is absorbed by the potato slices 12 as they are transported through the waveguide 14. A greater or lesser number of straight-line waveguide portions 14a could be selected if desired. Satisfactory microwave heating has been accomplished with the potato slices 12 travelling through as few as five straight-line waveguide portions 14a. In an alternative embodiment illustrated in FIG. 6 and discussed more fully below, multiple microwave waveguides are employed to repetitively cook the potato slices. In this embodiment, when the potato slices are essentially raw, the microwave waveguides have as few as two straight-line portions while the final waveguides through which the almost fully cooked potato slices pass have as many as six straight-line portions.

In one preferred embodiment of the microwave apparatus 14 discussed above, an input 26 to the waveguide 14 is coupled to a microwave generator having a 60 kilowatt power output at 915 megahertz. The cross-sectional dimensions of the waveguide 14, selected to optimize microwave transmission at this frequency, are the standard dimensions of a waveguide gearing the mil. spec. designation WR 9.75; that is 9.75 inches by 4.875 inches. The energy density at the waveguide input 26 can thus generally be characterized as approximately 1.25 kilowatts per square inch. Other frequencies within the microwave band of the electromagnetic spectrum could be employed, if desired. Discontinuities in the waveguide 14 such as the apertures 18, edges of the conveyor belt 20 and the potato slices 12 cause a standing wave pattern to form within the waveguide 14. As shown in FIG. 3, as a potato slice 12 is carried into the plane of the paper through a straight-line portion 14a of the waveguide a standing wave pattern 28a causes only localized heating in a region 29a of the potato slice 12. Thus, after exposure to a first straight-line section of the waveguide 14, the potato slice 12 will have a generally "striped" appearance as illustrated in FIG. 4. Each of the waveguide turns 16 is therefore configured to induce a shift in the position of the standing wave pattern within the straight-line section 14a of the waveguide 14 with respect to the conveyor belt 20, as illustrated in FIG. 3 by the standing wave pattern 28a and localized heated region 29a within the straight-line waveguide 14a shown relative to the position of a prior or subsequent standing wave pattern 28b disposed within an adjacent straight-line waveguide section (not shown). This displacement of the standing wave pattern 28a and 28b between adjacent straight-line waveguide sections 14a assures an even exposure of each potato slice 12 to microwave heating after the potato slice 12 has been conveyed through several straight-line waveguide sections 14a. To achieve this displacement it is sufficient to configure the waveguide turns 16 so that the circumference of radius of curvature down the middle of the waveguide differs from a whole number multiple of the wavelength of the microwaves being used to cook the potato slice.

The composition of the conveyor belt 20 is selected to be essentially transparent to the microwaves propagating within the waveguide 14 and to avoid adhesion of the potato slices 12 to the belt 20. In one preferred embodiment, the conveyor belt 20 is made of polypropylene. Alternatively, however, the conveyor belt 20 could be made of fiberglass covered with some form of adhesion resistant coating such as TEFLON TM.

Figure 7:
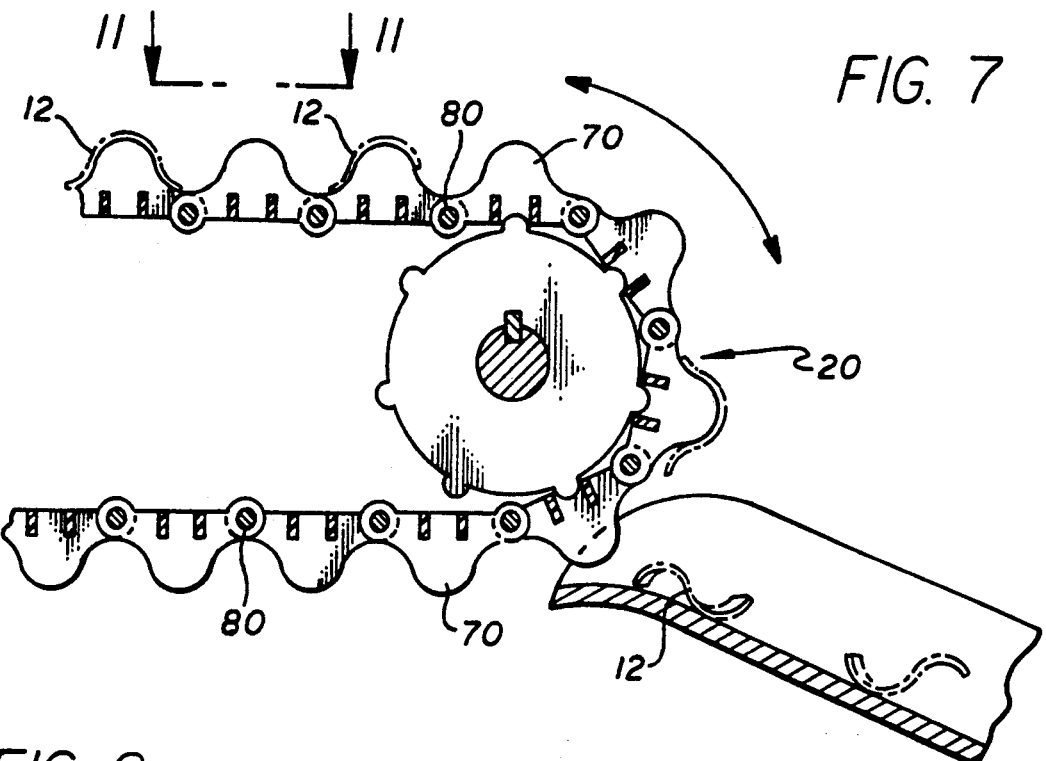
FIG. 7 is a side view of a preferred embodiment of the conveyor belt of the present invention.
Figure 8:
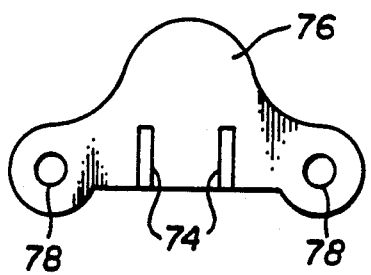
FIG. 8 is a side view of a belt link from the conveyor belt of the present invention shown in FIG. 7.
Figure 9:
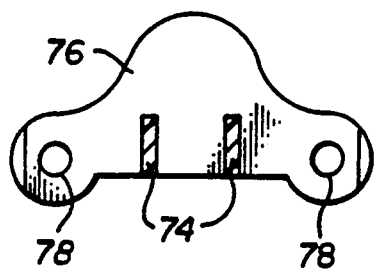
FIG. 9 is a sectional side view of the link shown in FIG. 8.
Figure 10:
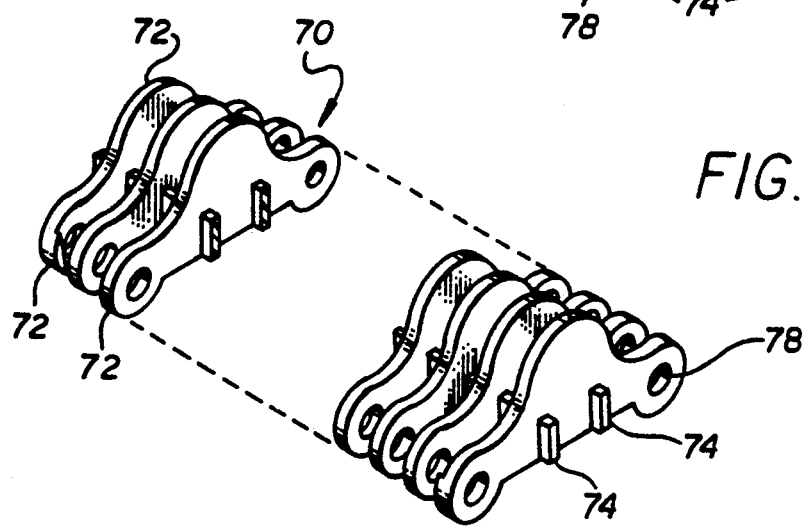
FIG. 10 is a partial perspective view of the conveyor belt link shown in FIGS. 8 and 9.
Figure 11:
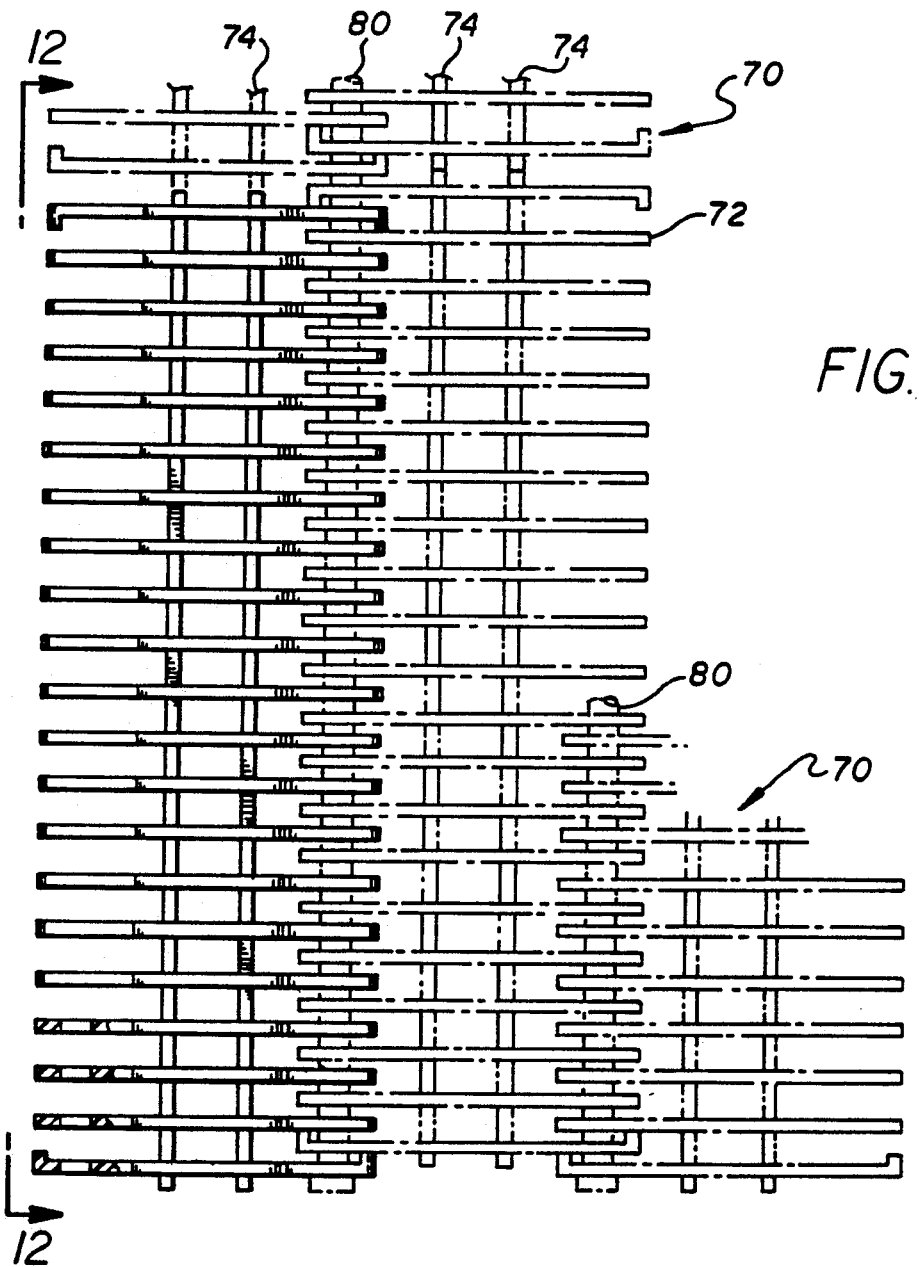
FIG. 11 is a partial top view of the conveyor belt of the present invention.
Figure 12:
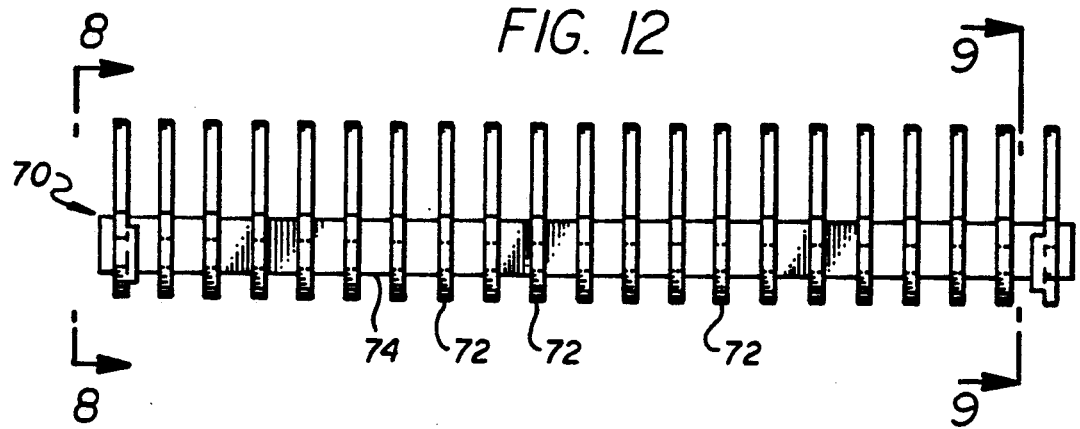
FIG. 12 is a side view of a conveyor belt link the present invention.

As shown in FIG. 7, the preferred embodiment of the conveyor belt 20 of the present invention is a continuous belt that is driven by any appropriate conventional drive mechanism such as a roller or sprocket drive means that are already well known in the art. The belt 20 is comprised of individual links 70 each having a generally open lattice structure. As seen in FIG. 8, the open lattice structure is formed by a plurality of vanes 72 arranged in substantially parallel planes that are preferably intersected by two parallel cross-pieces 74 at about a right angle thereto.

Each vane 72 has an accurate shape or hump 76 disposed along one surface, and two openings 78 disposed at each end. The openings 78 are adapted to receive mounting pins 80 when the links 70 are aligned and interconnected to form the continuous belt 20, as shown in FIG. 7. By using pins 80, the present invention assures that the links 70 may be easily replaced. Electrical arcing may sometimes occur when moisture accumulates on product slices being conveyed along the conveyor belt 20 through the high intensity meander waveguide 14 and the links 70 may be consequently burned or otherwise damaged. The pins 80 permit easy disassembly of the conveyor belt 20 for repair or replacement.

The hump 76 in each vane 72 is provided to impart a curved shape to the cooked potato slices. Potato chips produced in accordance with the method and apparatus of the present invention on a flat conveyor belt typically have a generally flat appearance that is not characteristic of traditionally deep fried potato chips. It has been found that a curved shape is preferable to impart a curved shape to the potato slices during the microwave cooking step of the process of the present invention, rather than at a later time, such as during the drying step of the snack preparation process of the present invention. Potato slices 12 randomly distributed on the conveyor belt 20 with humps 76 that are then transported through the meander waveguide 14 have been found to bear a close resemblance, after cooking, to conventional, deep fat fried chips that embody random curvatures.

Also regarding the conveyor belt 20, it has been determined that several dimensions of the open lattice structure of each link 70 are critical. First, it has been seen that the thickness of the vanes is optimally about 1/32 of an inch. A larger thickness causes moisture to accumulate under the slices 12 riding on the conveyor belt links 70, while a smaller thickness leads to damage to the link 70 when inadvertent electrical arcing occurs on the exterior surfaces of raw product slices during the high intensity microwave exposure step.

Second, the hump 76 has an optimal radius of curvature of approximately ½ of an inch. A radius that is too small can cause the raw product slices 12 to slide completely off the curved surface, while too small of a radius may not bend the slices 12 sufficiently to impart a satisfactory degree of curvature thereto.

Third, it has been found that the distance between adjacent vanes 72 is optimally about 0.27 inches. A larger distance disadvantageously allows the potato slices 12 to droop or even to fall through the vanes 72 of a conveyor link 70 unexpectedly; while a smaller separation distance disadvantageously restricts a sufficient air flow for satisfactory removal of surface moisture from exterior surfaces of the potato slices 12 by use of air jets. These heated jets of air are directed from above and below the raw, freshly washed and sliced, potato slices. Thus, overly small lattice openings inhibit air flow from the air knives. Residual moisture may then cause inadvertent electrical arcing between the potato slices 12 during the high intensity microwave exposure step.

Fourth, the overall height of a link 70 of the conveyor belt 20 is optimally one and three-eighths of an inch. This dimension is carefully selected in consideration of the one-sixteenth of an inch typical thickness of the raw product slices that are transported on the conveyor belt 20. It has further been observed that the randomly distributed slices do not all necessarily remain flat and flush with the surface of the conveyor belt 20. Hence, the height of the conveyor belt 20 becomes critical to ensure clear and unobstructed passage through the precise opening of the aperture 18 of the waveguide 14.

As previously mentioned, the duration of exposure of the potato slices 12 to the high intensity microwave field is fairly brief. In the preferred embodiment of the microwave cooking structure discussed above and illustrated in FIG. 2, the conveyor belt 20 moves at a rate of about 15 to 20 feet per minute. Each straight-line section of the waveguide 14 has a width of about 4.875 inches, the potato slices 12 are subjected to an exposure time of approximately 1.25 to 1.66 seconds each time the potato slices pass through a straight-line section 14a of the waveguide 14. In a system employing 20 straight-line waveguide sections 14a, the total exposure time for each potato slice 12 would be approximately 25 to 33 seconds. As mentioned above, the desired intensity of the microwave field can be varied inversely with the duration of exposure, so long as the field intensity is sufficient to convert moisture within the raw potato slice into steam rapidly enough to prevent formation and hardening of a starch layer. Thus power levels other than 60 kilowatts could be coupled to the waveguide input 26 to puff the potato slice and roughen its exterior surface so long as the rate of travel for the conveyor belt 20 is properly increased or decreased. Power levels as low as 25 kilowatts with associated input energy densities as low as 630 watts per square inch have been successfully used to prepare potato chips by the method and apparatus of the present invention. It is believed microwave energy levels as low as 3-4 kilowatts could be coupled to the waveguide input 26 to satisfactorily cook potato slices by the method and apparatus of the present invention. At microwave input energy levels below 3 kilowatts, however, it is believed there is inadequate heating of the potato slice in a sufficiently brief period of time to achieve the desired effects in the potato slice without the additional formation of an undesirable starch layer. Thus, coupling lower energy levels to the microwave input 26 could be engineered to subject the potato slices 12 to sufficient microwave energies to eventually achieve a desired degree of dehydration the potato slices (for example by reducing the rate of travel for the conveyor belt to increase the duration of microwave exposure), but not before the formation of a starch layer occurs. As noted above, this starch layer imparts a gummy surface and an undesirable taste to the resultant chip or, in some instances, reduces the shelf life of the resultant chip.

Because a large amount of moisture escapes from the potato slices 12 during exposure to the high intensity microwave field, hot air convection can be employed to minimize condensation within the waveguide 14. Such condensation would decrease the amount of microwave energy available for transfer to the potato slices 12. In the preferred embodiment, hot air blowers 27 maintain the ambient temperature at and around the waveguide 14 at approximately 200° F. The hot air blowing through the waveguide 14 also contributes to the dehydration of the potato slice during this first cooking step. Other anti-condensation schemes can, of course, be employed. For example, lower temperature air movement could be employed along with electrical heating of the waveguide 14.

Figure 6:
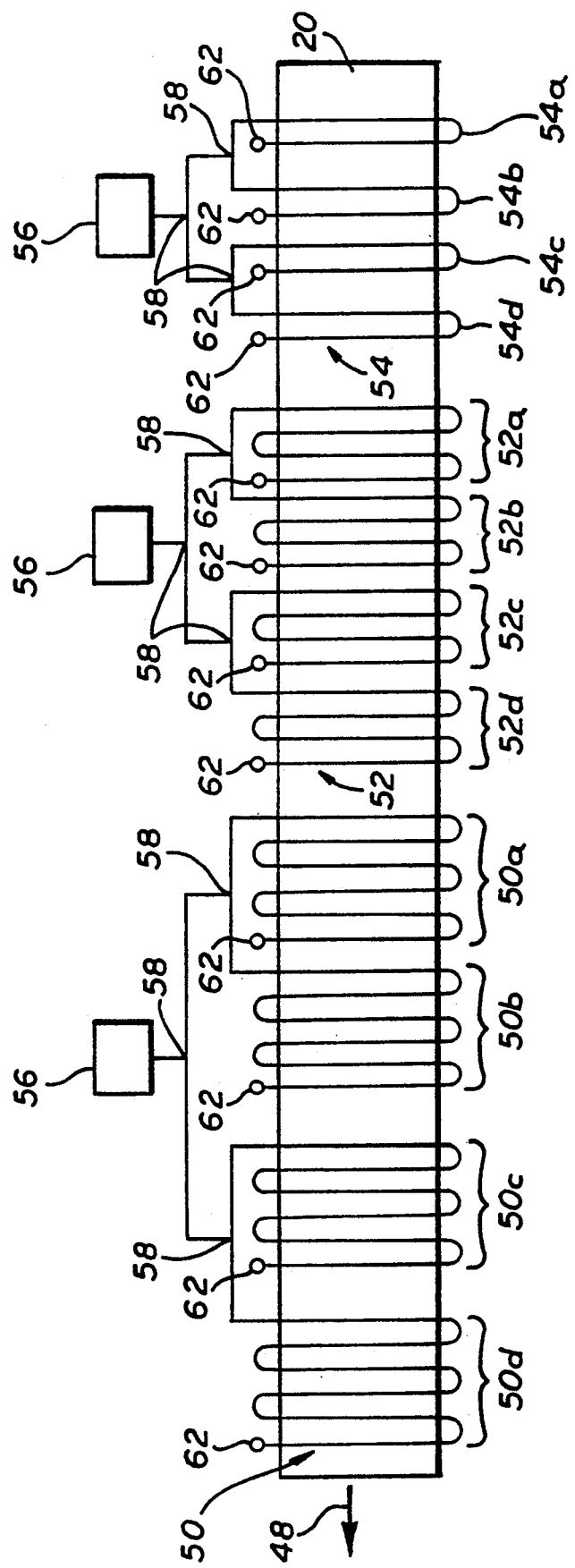
FIG. 6 is a diagrammatic representation of an alternative embodiment of the microwave waveguide apparatus of the present invention for exposing a product slice to a high intensity microwave field.

Referring to FIG. 6 there is shown an alternative embodiment of the apparatus of the current invention suitable for implementing the high intensity microwave cooking step of the method of the present invention. It is believed the raw potato or other product slices absorb a substantial portion of the microwave energy propagating within the microwave waveguide within the first few straight line portions of the waveguide that engage the conveyor belt. It is also believed that the amount of microwave energy absorbed by the potato or other product slices each time the potato or product slices passes through a straight line portion of the waveguide decreases with the reduction of the moisture within the product slice. Accordingly, it is believed a more efficient transfer of microwave energy to the product slice is achieved by using multiple microwave power supplies and fewer microwave waveguide portions per power supply.

As shown in FIG. 6 a microwave transparent conveyor belt 20 engages a series 50, 52 and 54 of microwave waveguides with each series of waveguides coupled to a separate microwave power supply 56. The conveyor belt 20 travels in the direction 48 indicated to the left of FIG. 6. To accommodate the decrease in microwave energy as the potato or other product slices are dehydrated, the number of straight line portions of microwave waveguide engaging the conveyor belt increases as the product slices are carried to the end of the conveyor belt 20. It is also believed the cost of the apparatus for the high intensity microwave step of the present invention can be reduced by using high power microwave power sources 60 and distributing the microwave output to several separate single mode waveguides. Thus, the microwave power source 56 coupled to the waveguide series 54 includes microwave dividers 58 to distribute microwave energy to four separate single mode waveguide 54a–d. These microwave dividers preferably evenly divide the microwave energy along each path. Such dividers are well known in the microwave art and are commonly referred to as "MAGIC-T's". Since the series of waveguides 54 is located at the upstream end of the conveyor belt 20 where the product slices still contain virtually all of their natural moisture, only a pair of straight line portions of each single mode waveguide engages the conveyor belt 20. To maintain generally single mode microwave propagation within the waveguides, each waveguide terminates in a microwave absorptive load 62 such as a water load.

Each successive series of waveguides 52 and 50 contain an increasing number of straight line waveguide portions. Thus, the series of waveguides 52 includes four straight line waveguide portions engaging the conveyor belt 20 for each separate waveguide 52a–52d coupled to the microwave power supply 56. Similarly the waveguide series 50 includes six straight line waveguide portions engaging the conveyor belt 20 for each separate waveguide 50a–50d coupled to the microwave power supply 56. Each of the separate waveguides in the series 52 and 50 similarly end in an microwave absorptive load 62. As in the other embodiment discussed above, each bend in the separate waveguides that couples a pair of straight-line waveguide portions together is also configured to induce a shift in the relative positions in the standing wave pattern formed in adjacent straight line portions.

In one preferred embodiment, the microwave power supplies 56 each generate 60 kilowatts of microwave energy so that 15 kilowatts is launched into each single mode waveguide 50a–50d, 52a–52d and 54a–54d. Using a six foot wide conveyor belt 20 travelling at twenty feet per minute this embodiment of the high intensity microwave apparatus of the present invention should be able to produce as much as 400 pounds of potato chips per hour. Similarly, as discussed above the power supplies 56 may generate any desired or permitted frequency in the microwave band of the spectrum. Currently the United States Federal Communication Commission has only approved 915 Mhz and 2450 Mhz for microwave applications such as discussed herein. Thus, for example, the power supplies 56 could generate microwaves at 915 Mhz with the travelling wave waveguides in each separate waveguide set having cross-sectional dimensions designated by the military specification mil. spec. WR9.75. Alternatively, of course, different microwave frequencies could be employed for the different power supplies 56, if desired. The separate waveguides, however, would have to be dimensioned in accordance with these differing frequencies.

After exposure to the high intensity microwave field so as to puff the potato slices and roughen their exterior surface texture, further processing of the slices is still required to dry them into potato chips. This final drying step can be advantageously accomplished by a low power multi-mode microwave drying unit. In one preferred embodiment suitable for preparing potato chips, a conventional microwave "drying unit" Model No. IV-60, available from MICRODRY INC. of Crestwood, Ky., is employed. This unit is typically 48 feet long and includes a microwave-transparent conveyor belt which is six feet wide. The conveyor belt is disposed between two perforated stainless steel plates disposed parallel to one another so as to form a multi-mode microwave cavity. Microwaves are injected into this cavity through two waveguides disposed along the top of the cavity with apertures communicating between the waveguide and the cavity. As many as four 60 kilowatt microwave generators may be coupled to the waveguides to provide a total power input of 240 kilowatts into the microwave cavity. In one embodiment of the present invention, two 60 kilowatt microwave generators are coupled to the waveguides of the drying unit to provide a total power input of 120 kilowatts to the microwave cavity of the drying unit. The intensity of the microwave field within the MICRODRY drying unit, however, is significantly lower than the field intensity within the meander waveguide 14 because of the substantially larger size of the microwave cavity in the baking unit. Typically a maximum energy density available from this unit for the microwave field within the baking unit is on the order of 6 watts per square inch. This energy density is sufficient to dry the partially processed potato slices but would not cause the puffing and surface roughening that occurs in the microwave field exposure of the cooking step. The actual microwave energy density employed, however, depends both on the chip density desired within the drying unit and the rate of travel for chips through the unit. If a maximum travel rate is desired so as to optimize chip production, then the maximum 240 kilowatt power input would preferably be employed. As used in this description, the term low intensity microwave field means a field intensity that is insufficient to induce these effects.

During this final drying stage of the chip preparation process, the moisture content of the potato slices is reduced from about 25% to 30% by weight to a final amount of about 2% to 4% by weight. Typically the conveyor belt moves at a rate of ten to fifteen feet per minute, providing an exposure time for the potato slices of between about 3.2 and 4.8 minutes. Hot air is also injected into the microwave cavity at a temperature of about 180° to 200° F. at a rate of approximately 100 feet per minute. This hot air movement prevents condensation within the drying cavity and contributes to the final crispening of the chips. During this stage of the chip preparation process, the chips need not be arranged in a single layer to achieve satisfactory drying and, in the preferred embodiment, are arranged in layers of up to approximately four inches deep.

Referring to FIG. 5, the MICRODRY drying unit 30 is shown adjacent the high intensity microwave apparatus 10. A conveyor belt 32 of the drying unit 30 may be disposed slightly underneath an output end 34 of the conveyor belt 20 to catch the potato slices 12 as they leave the microwave apparatus 10. If desired, spraying units 36 may be disposed at the output end 34 of the conveyor belt 20 to apply seasonings to the partially cooked potato slices before final drying. Such seasonings are typically employed to add "barbecued" or other flavorings to the chips. In the preferred embodiment, however, such seasonings are applied to the potato slices after they pass through and exit the drying unit 30. As noted above, a minute quantity of natural oil flavoring of less than ⅛ gram per ounce of weight of the potato slice is applied to the partially cooked potato slices 12 after the high intensity microwave exposure step and before the potato slices 12 enter the drying unit 30. The chips leaving the baking unit 30 are in final form, ready for any desired final inspection and subsequent packaging.

As noted above, the apparatus illustrated in FIG. 5 shows a single high intensity microwave apparatus 10 disposed adjacent a single drying unit 30. It should be understood, however, that the present invention is not limited to the configuration illustrated in FIG. 5. If desired, two or more high intensity microwave apparatus 10 may also be used in conjunction with a single drying unit 30. The use of multiple high intensity microwave apparatus 10 in conjunction with a single drying unit 30 may be desired, for example, to advantageously maximize production capacity in instances where the product output rate of any single high intensity microwave apparatus 10 is less than the product rate of the drying unit 30. Transporting product output from multiple high intensity microwave apparatus 10 to a single drying unit 30 may be performed in a variety of methods known in the relevant art. One such method includes the use of an additional conveyor belt oriented at generally right angles to the multiple high intensity microwave apparatus 30 and positioned along the outputs of the conveyor belts 20 of the multiple high intensity apparatus 10 to convey product to the drying unit 30.

Application of the method and apparatus of the present invention to potato slices has been found to produce a potato chip having the well recognized texture, consistency and flavor of the traditionally deep fat fried potato chip, but lacking any added fat. Further advantages of the present invention includes an extended shelf life for the resulting chips as well as the elimination of certain chip preparation safety hazards commonly associated with working around large quantities of hot oil necessary for batch preparation of potato chips.

The following examples illustrate two embodiments of the present invention:

EXAMPLE 1

Fresh raw Idaho Russet potatoes are first sliced, peeled and water washed. The raw potato slices are then placed on a polypropylene conveyor belt in a single layer. The potato slices are arranged as close to one another as possible without contacting with one another as so to avoid arcing when the potato slices are exposed to the high intensity microwave field. The polypropylene conveyor belt then transports the potato slices through a meander microwave waveguide having a 360 kilowatt input at 915 Mhz. These waveguides include ninety-six straight-line portions through which the potato slices are carried by the conveyor belt. The waveguide is approximately 4.875 inches wide and the conveyor belt travels at a speed of 18–20 feet per minute, resulting in the exposure time of 1.25 to 1.66 seconds each time the potato slices are conveyed through a straight-line section of the waveguide. The output from this initial conveyor belt is positioned at the input to a Model No. IV-60 microwave and hot air drying unit available from MICRODRY INC. of Crestwood, Ky. The drying unit includes a multi-mode microwave cavity having a 120 kilowatt input and transferring approximately 80% of this energy input into the potato slices. Hot air at 180° to 200° F. is transported through a preferred conveyor belt of the drying unit at 100 feet per minute. The drying unit conveyor belt is 48 feet long and transports the potato slices at a rate of 6 to 8 feet per minute, resulting in an exposure time of 6 to 8 minutes. Potato slices transported through the baking unit are layered approximately 3 to 4 inches thick. The resulting potato chips prepared in this fashion have an appearance and taste similar to potato chips prepared by deep fat frying in that their surface texture is roughened and the moisture content of the resultant chip is reduced to about 3 to 6 percent by weight.

EXAMPLE II

Raw potato slices were placed on the conveyor belt 20 of the apparatus illustrated in FIG. 2, and described above, with the conveyor belt 20 stationary so that the potato slices remained within the straight line portions 14a of the microwave waveguide 14 for the full interval of their microwave exposure. The power level of the microwave input to the waveguide 26 was then varied between 4 kilowatts and 1 kilowatt for exposure periods of 3 minutes and 5 minutes at each power level. New sets of raw potato slices were used each time the power output level was increased or the exposure time changed. At power input levels of 4 kilowatts for periods of about 3 minutes the potato slices puffed into normal chips. Similarly, injecting 3 kilowatts into the microwave waveguide 14 for a period of 3 minutes appeared to puff the raw slices into normal chips, although a very slight degree of starch migration was observed. When 2 kilowatts were coupled into the waveguide for a 3 minute exposure, however, a gelatinous starch build up was quite evident and negligible puffing on the potato slice resulted. Coupling 1 kilowatt into the waveguide 14 for 3 minutes created significant gelatinous build up without any observable puffing of the potato slice. New sets of raw potatoes were again placed in the microwave waveguide 14 for 5 minute exposure periods with power levels of 2 kilowatts and 1 kilowatt injected into the waveguide 14. The increased duration of microwave exposure induced negligible to very slight puffing in the potato slices and only served to turn the gelatinous layer of starch very hard. Thus using a 915 Mhz microwave power source coupled to a mil. spec. WR9.75 waveguide, a minimum of 3 kilowatts are required to achieve the desired result of cooking a potato slice by the method of the present invention. A "sizzling" sound indicative of steam venting from the potato slices was audible at the 3 and 4 kilowatt power levels at which the potato slices could be satisfactorily cooked in accordance with the method of the present invention and that this sound was absent at the 1 and 2 kilowatt power levels.

While the present invention has been described with reference to the preparation of potato chips, other chips may similarly be prepared by the inventive method described above. Thus, for example, corn chips, tortilla chips and the like can similarly be prepared by forming a corn meal dough into appropriately configured slices for transport through the high intensity microwave field. Additionally, while single mode microwave waveguides are employed to optimize the preparation and transfer of microwave energy to the potato slices, multimode microwaves could be employed in the novel cooking step of the present invention, if desired, so long as sufficiently high microwave power levels are employed. Those skilled in the art will appreciate that various substitutions, omissions, modifications and changes may be made in the method and apparatus of the present invention without departing from the scope or spirit thereof. Accordingly, it is intended that the foregoing description be considered merely exemplary of the present invention and not a limitation thereof.

What is claimed is:

1. An apparatus for the preparation of fat free chip-type snacks from product slices, comprising:
   a microwave transparent conveyor belt for carrying product slices;
   a first pair of microwave waveguides configured to repeatedly envelope at least one side of said conveyor belt;
   a first microwave power source coupled to said waveguides so as to generally evenly distribute the microwave output of the power source into each waveguide; and
   a drying oven,
   wherein product slices carried by the conveyor belt are subjected to a microwave field of sufficient intensity to puff the slices and roughen their exterior surfaces and wherein these microwave exposed slices are later dried and crispened into chips in the drying oven.

2. The apparatus of claim 1 wherein the microwave source generates at least 3 kilowatts and wherein at least two separate portions of each waveguide engages the conveyor belt.

3. The apparatus of claim 1 wherein the waveguides end in microwave absorptive terminators.

4. The apparatus of claim 1 wherein the first pair of microwave waveguides include apertures through which the conveyor belt passes, wherein the apertures include a height dimension transverse to a width of the conveyor belt of approximately one and three-eights of an inch.

5. The apparatus of claim 1 further comprising:
   a second pair of microwave waveguides configured to repeatedly engage at least one side of said conveyor belt; and
   a second microwave source coupled to said second pair of waveguides so as to generally evenly distribute the microwave output of the power source to the second pair of waveguides.

6. The apparatus of claim 5 wherein the first pair of waveguides each engage the conveyor belt at least twice and wherein the second pair of waveguides each engage the conveyor belt at least three times.

7. The apparatus of claim 5 wherein said first and second microwave sources generate at least 3 kilowatts.

8. The apparatus of claim 5 further comprising:
   a third pair of microwave waveguides configured to repeatedly engage at least one side of said conveyor belt; and
   a third microwave source coupled to said third pair of waveguide so as to generally evenly distribute the microwave output of the third power source to the third pair of waveguides.

9. The apparatus of claim 8 wherein the first pair of waveguides engage the conveyor belt at least twice, the second pair of waveguides engage the conveyor belt at least three times, and a third pair of waveguides each engage the conveyor belt at least four times.

10. The apparatus of claim 8 wherein each of the first, second and third microwave sources generate at least 3 kilowatts.

11. An apparatus for fat free preparation of chip-type snacks from slices of raw food, comprising:
    a microwave transparent conveyor belt for carrying raw food slices;
    a microwave waveguide configured to repeatedly envelope at least one side of said conveyor belt;
    a microwave source coupled to said waveguide; and
    an oven,
    wherein raw food slices carried by the conveyor belt are first subjected to a microwave field of sufficient intensity within the waveguide so as to puff the food slices and roughen their exterior surfaces and wherein these microwave exposed slices are later dried and crispened into chips in the oven.

12. The apparatus of claim 11 wherein the waveguide ends in a microwave absorptive terminator and wherein the microwave field within the waveguide is substantially a single mode field.

13. The apparatus of claim 11 wherein the microwave source generates at least 25 kilowatts and wherein at least five separate portions of the waveguide engage the conveyor belt.

14. The apparatus of claim 11 wherein the conveyor belt comprises a continuous belt, driven by a roller, including a plurality of links having an open lattice structure coupled by pivotally mounted pins, wherein the open lattice structure is formed by a plurality of vanes intersected by a plurality of cross-pieces.

15. The apparatus of claim 14 wherein each vane comprises a first surface having a hump for imparting a curved shape to the raw food slices.

16. The apparatus of claim 15 wherein the distance between adjacent vanes is approximately $\frac{1}{8}$ inch.

17. The apparatus of claim 16 wherein the vane includes a thickness of approximately 1/32 inch.

18. The apparatus of claim 17 wherein the hump is centrally disposed along the first surface of the link and has an arcuate shape.

19. The apparatus of claim 18 wherein the hump includes a radius of curvature of approximately $\frac{1}{2}$ of an inch.

20. An apparatus for the preparation of fat free snack chips from raw product slices, comprising:
    a microwave transparent conveyor belt for carrying raw product slices, said conveyor belt including a plurality of links having an open lattice structure that are interconnected by pivotally mounted pins;
    a first pair of microwave waveguides configured to repeatedly envelope at least one side of said conveyor belt;
    a first microwave power source coupled to said waveguides so as to generally evenly distribute the microwave output of the power source into each waveguide; and
    a drying oven, wherein product slices carried by the conveyor belt are subjected to a microwave field of sufficient intensity to puff the slices and roughen their exterior surfaces and wherein these microwave exposed slices are later dried and crispened into chips in the oven.

21. The apparatus of claim 20 wherein each vane comprises a product slice supporting surface having a hump.

* * * * *